(12) United States Patent
Imai et al.

(10) Patent No.: US 7,262,143 B2
(45) Date of Patent: Aug. 28, 2007

(54) SEMICONDUCTIVE GLAZE PRODUCT, METHOD FOR PRODUCING THE GLAZE PRODUCT, AND INSULATOR COATED WITH THE GLAZE PRODUCT

(75) Inventors: Osamu Imai, Kasugai (JP); Masaru Murase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 551 days.

(21) Appl. No.: 10/661,347

(22) Filed: Sep. 12, 2003

(65) Prior Publication Data

US 2004/0084659 A1 May 6, 2004

(30) Foreign Application Priority Data

Sep. 13, 2002 (JP) ............................. 2002-268765

(51) Int. Cl.
*C03C 8/14* (2006.01)
*C03C 8/02* (2006.01)

(52) U.S. Cl. ............................. 501/17; 501/21; 501/14

(58) Field of Classification Search ................ 501/14, 501/17, 21, 16, 18, 19
See application file for complete search history.

(56) References Cited

U.S. PATENT DOCUMENTS 3,658,583 A 4/1972 Ogawa et al.
3,888,796 A 6/1975 Nigol
4,112,193 A 9/1978 Higuchi et al.
4,232,185 A 11/1980 Higuchi et al.

FOREIGN PATENT DOCUMENTS

EP 0 981 154 A2 2/2000
GB 1485806 A 9/1977

OTHER PUBLICATIONS

Parmelee, Cullen W., Ceramic Glazes,Dec. 1973, Cahners Publishing Company, Inc., Third Edition, pp. 221-225, 274-277, 330-331, 342-345, 426-427, and 454-456.*

* cited by examiner

*Primary Examiner*—Anthony J. Green
*Assistant Examiner*—Elizabeth A. Bolden
(74) *Attorney, Agent, or Firm*—Burr & Brown

(57) ABSTRACT

A semiconductive glaze product is provided, which exhibits low thermal expansion coefficient without adversely affecting other glaze characteristics, and which, when applied to an insulator, attains enhanced mechanical strength of the insulator. The semiconductive glaze product contains a glaze composition and a flux. The glaze composition contains a $KNaO$—$MgO$—$CaO$—$Al_2O_3$-$SiO_2$ base glaze, in which the compositional proportions of $KNaO$, $MgO$, and $CaO$, as represented by the Seger formula, are 0.1 to 0.4, 0.2 to 0.6, and balance, respectively. The glaze composition contains a metal oxide composition including tin oxide and antimony oxide, wherein the amount of flux is 10 parts by weight or less on the basis of 100 parts by weight of the glaze composition.

6 Claims, No Drawings

SEMICONDUCTIVE GLAZE PRODUCT, METHOD FOR PRODUCING THE GLAZE PRODUCT, AND INSULATOR COATED WITH THE GLAZE PRODUCT

CROSS-REFERENCE TO RELATED APPLICATION

This application claims the benefit of Japanese Application 2002-268765, filed Sep. 13, 2002, the entirety of which is incorporated herein by reference.

BACKGROUND OF THE INVENTION

1. Field of the Invention

The present invention relates to a semiconductive glaze product which is applied to the surface of a ceramic insulator to thereby form a conductive glaze insulator, to a method for producing the glaze product, and to an insulator coated with the glaze product.

2. Background Art

Conventionally, a ceramic insulator has been coated with a glaze so as to enhance the strength of the insulator. This makes use of the "compression effect" of glaze, in which the glaze layer compresses the insulator by means of the difference in thermal expansion coefficient between the insulator and the glaze (in general, the thermal expansion coefficient of an insulator is higher than that of a glaze). Among various glazes, a semiconductive glaze is applied to the surface of an insulator for allowing a small amount of current to flow through the surface of the coated insulator, to thereby remove dirt or contaminants adhering thereto and improve the insulator's electrical insulating characteristics, which may otherwise deteriorate when dirt or contaminants deposit on the surface of the insulator.

The applicant company of the present invention has disclosed such semiconductive glazes; specifically, a fritted tin oxide-antimony oxide-based conductive glaze (see Japanese Patent Publication (kokoku) No. 49-3816, page 6); a tin oxide-antimony oxide-niobium oxide-based conductive glaze (see Japanese Patent Publication (kokoku) No. 55-37804, page 1); and a tin oxide-antimony oxide-based conductive glaze in which ρ distribution is regulated (see Japanese Patent Publication (kokoku) No. 59-23051, page 1).

The aforementioned conductive glazes have a high thermal expansion coefficient of about 0.32%. When such a conventional conductive glaze is applied to a base material having a high thermal expansion coefficient (e.g., a cristobalite base material having a thermal expansion coefficient of about 0.42%), the difference in thermal expansion coefficient between the conductive glaze and the base material is about 0.10 percentage points, and thus the glaze exhibits sufficient compression effect.

However, when the aforementioned conventional conductive glaze is applied to a non-cristobalite base material having a thermal expansion coefficient of about 0.38%—which base material, in recent years, has been employed in, for example, an LP insulator, an SP insulator, or a porcelain bushing—since the difference in thermal expansion coefficient between the glaze and the base material becomes as small as 0.06 percentage points, the compression effect of the glaze is lowered by such a small difference in thermal expansion coefficient, leading to a problem that the strength of the resultant insulator is lowered; i.e., the insulator fails to attain a predetermined strength.

SUMMARY OF THE INVENTION

In view of the foregoing, an object of the present invention is to provide a semiconductive glaze product which exhibits low thermal expansion coefficient without adversely affecting other glaze characteristics, and which, when applied to an insulator, attains enhanced mechanical strength of the insulator. Another object of the present invention is to provide a method for producing the semiconductive glaze product. Yet another object of the present invention is to provide an insulator coated with the semiconductive glaze product.

According to a first aspect of the present invention, there is provided a semiconductive glaze product comprising a glaze composition and a flux, the glaze composition containing a $KNaO$—$MgO$—$CaO$—$Al_2O_3$—$SiO_2$-based base glaze in which the compositional proportions as represented by the Seger formula of basic components; i.e., $KNaO$, $MgO$, and $CaO$, are 0.1 to 0.4, 0.2 to 0.6, and balance, respectively, and containing a metal oxide composition including tin oxide and antimony oxide, wherein the amount of the flux is 10 parts by weight or less on the basis of 100 parts by weight of the glaze composition.

In the aforementioned semiconductive glaze product of the present invention, the compositional proportions as represented by the Seger formula of $KNaO$, $MgO$, and $CaO$ constituting the base glaze contained in the glaze composition are regulated to 0.1 to 0.4, 0.2 to 0.6, and balance, respectively, and the amount of the flux is regulated to 10 parts by weight or less on the basis of 100 parts by weight of the glaze composition. By virtue of the synergistic effects obtained by regulation of the compositional proportions of the basic components of the base glaze and regulation of the amount of the flux, the semiconductive glaze product exhibits low thermal expansion coefficient without adversely affecting other glaze characteristics. Therefore, when the semiconductive glaze product is applied to an insulator, the resultant insulator exhibits high mechanical strength, and the thus-applied glaze product exhibits excellent surface conditions.

In the aforementioned semiconductive glaze product of the present invention, preferably, the flux is boron oxide; the compositional proportions as represented by the Seger formula of $Al_2O_3$ and $SiO_2$ constituting the base glaze are 0.5 to 0.9 and 4 to 7, respectively; the amounts of the base glaze and the metal oxide composition contained in the glaze composition are 60 to 80 wt. % and 40 to 20 wt. %, respectively; the antimony oxide content of the metal oxide composition is 2 to 15 wt. %; and the metal oxide composition contains niobium oxide in an amount of 5 wt. % or less.

According to a second aspect of the present invention, there is provided a method for producing a semiconductive glaze product comprising mixing predetermined amounts of a flux and a glaze composition containing a base glaze and a metal oxide, the flux and the composition serving as raw materials; and adding water to the resultant mixture to thereby form a slurry, wherein particles of the raw materials; i.e., the glaze composition and the flux, are reduced in size such that large particles having a size of 10 μm or more account for 15 wt. % or less of the entirety of the particulate raw material mixture.

In the aforementioned method for producing a semiconductive glaze product of the present invention, particles of the raw materials are reduced in size such that large particles having a size of 10 μm or more account for 15 wt. % or less of the entirety of the particulate raw material mixture. A semiconductive glaze product produced through the production method exhibits low thermal expansion coefficient without adversely affecting other glaze characteristics. Therefore, when the semiconductive glaze product is applied to an insulator, the resultant insulator exhibits high mechanical strength, and the thus-applied glaze product exhibits excellent surface conditions.

In the aforementioned method for producing a semiconductive glaze product of the present invention, preferably, wollastonite is employed as a Ca source.

According to a third aspect of the present invention, there is provided an insulator comprising an insulator main body whose surface is coated with the semiconductive glaze product of the present invention. The insulator including the insulator main body coated with the semiconductive glaze product of the present invention exhibits high mechanical strength even when the base material of the insulator exhibits a low thermal expansion coefficient.

DETAILED DESCRIPTION OF THE INVENTION

A characteristic feature of the semiconductive glaze product of the present invention resides in that the semiconductive glaze product contains a glaze composition containing a $KNaO$—$MgO$—$CaO$—$Al_2O_3$—$SiO_2$-based base glaze in which the compositional proportions as represented by the Seger formula of basic components; i.e., KNaO, MgO, and CaO, are 0.1 to 0.4, 0.2 to 0.6, and balance, respectively; and in that the semiconductive glaze product contains a flux in an amount of 10 parts by weight or less on the basis of 100 parts by weight of the glaze composition. As used herein, "the Seger formula" refers to a chemical formula employed for representing compositional proportions of components constituting a glaze product.

In the present invention, the compositional proportion of KNaO as represented by the Seger formula is determined to be 0.1 to 0.4, for the following reasons. As is clear from the results of the below-described Examples, when the compositional proportion of KNaO is less than 0.1, the glaze product exhibits poor melting characteristics, whereas when the compositional proportion of KNaO exceeds 0.4, the thermal expansion coefficient of the glaze product fails to attain a desired low level. The compositional proportion of KNaO as represented by the Seger formula more preferably falls within a range of 0.2 to 0.35. Meanwhile, the compositional proportion of MgO as represented by the Seger formula is determined to be 0.2 to 0.6, for the following reasons. As is clear from the results of the below-described Examples, when the compositional proportion of MgO is less than 0.2, the thermal expansion coefficient of the glaze product fails to attain a desired low level, whereas when the compositional proportion of MgO exceeds 0.6, the resistance of the glaze product increases, and the glaze product exhibits poor melting characteristics. The compositional proportion of MgO as represented by the Seger formula more preferably falls within a range of 0.25 to 0.5.

When an insulator is coated with a semiconductive glaze having poor melting characteristics, air bubbles may be produced and thus the resultant insulator will have uneven surfaces which can be visually observed as irregularities. Such uneven surfaces invite problems (e.g., chipping) when current actually flows through the surface of the insulator. Meanwhile, in the case where a semiconductive glaze fails to exhibit a desired low thermal expansion coefficient, when the glaze is applied as a conductive glaze to the surface of, for example, a non-cristobalite base material exhibiting low thermal expansion coefficient, which has been in high demand in recent years, the resultant insulator fails to exhibit sufficient fracture toughness.

In the $KNaO$—$MgO$—$CaO$—$Al_2O_3$—$SiO_2$-based base glaze, preferably, the compositional proportions of $Al_2O_3$ and $SiO_2$ as represented by the Seger formula are determined to be 0.5 to 0.9 and 4 to 7, respectively. The compositional proportion of $Al_2O_3$ is preferably 0.5 to 0.9, since, when the $Al_2O_3$ compositional proportion is less than 0.5, the resultant semiconductive glaze may exhibit high thermal expansion coefficient, whereas when the $Al_2O_3$ compositional proportion exceeds 0.9, the resultant glaze may exhibit poor melting characteristics. Meanwhile, the composition proportion of $SiO_2$ is preferably 4 to 7, since, when the $SiO_2$ compositional proportion is less than 4, high thermal expansion coefficient may result, whereas when the $SiO_2$ compositional proportion exceeds 7, poor melting characteristics may result.

No particular limitations are imposed on the content ratio between the base glaze and the metal oxide composition constituting the glaze composition, and the ratio may be determined as in the case of a conventional glaze. For example, the amount of the base glaze constituting the glaze composition is preferably 60 to 80 wt. %, more preferably 65 to 75 wt. %; and the amount of the metal oxide composition constituting the glaze composition is preferably 40 to 20 wt. %, more preferably 35 to 25 wt. %. No particular limitations are imposed on the amounts of tin oxide and antimony oxide contained in the metal oxide composition, and the amounts of these oxides may be determined as in the case of the metal oxide employed in a conventional glaze. For example, the amount of antimony oxide contained in the metal oxide composition is determined to be 2 to 15 wt. %. The metal oxide composition may further contain niobium oxide in an amount of 5 wt. % or less. When the content ratio between the base glaze and the metal oxide composition and the amounts of the metal oxides contained in the metal oxide compositions are determined as described above, the resultant semiconductive glaze product exhibits excellent surface resistivity, resistance-temperature characteristics, and electrolytic corrosion resistance.

The reason why a flux (preferably boron oxide) is incorporated into the glaze composition is that the presence of flux improves melting characteristics of the glaze product through the fluxing effect. In the present invention, a limitation is imposed on the amount of the flux; specifically, the amount of the flux (preferably, the amount of boron as reduced to boron oxide) is determined to be 10 parts by weight or less on the basis of 100 parts by weight of the glaze composition. Otherwise, the resistance and thermal expansion coefficient of the resultant glaze product would become unacceptably high.

A characteristic feature of the method for producing the semiconductive glaze product of the present invention resides in that the particle size of raw materials; i.e., a glaze composition and a flux, is reduced such that large particles having a size of 10 μm or more account for 15 wt. % or less of the entirety of the particulate raw materials. This reduction in particle size is performed with an aim toward improving the melting characteristics of the resultant glaze product. The production method of the present invention employs wollastonite as a Ca source. This is because when wollastonite is employed as a Ca source, generation of air bubbles is prevented in the resultant glaze product, as compared with the case of a conventional glaze production method in which calcium carbonate is employed as a Ca source.

EXAMPLES

The present invention will next be described by way of examples.

Example 1

Tin oxide (94 wt. %), antimony oxide (5 wt. %), and niobium oxide (1 wt. %) were mixed together, to thereby prepare a metal oxide composition. Separately, there was prepared a base glaze containing KNaO, MgO, CaO (compositional proportions of these components as represented by the Seger formula are shown in Table 1), 0.7 $Al_2O_3$, and 5.0 $SiO_2$. Subsequently, the above-prepared metal oxide composition (30 wt. %) was mixed with the above-prepared base glaze (70 wt. %), to thereby prepare a glaze composition. Thereafter, boron oxide serving as a flux (the amount of the flux is shown in Table 1) was incorporated into the thus-prepared glaze composition (100 parts by weight). Water (65 parts by weight) was added to the resultant mixture, and milled and mixed by use of a ball mill, to thereby prepare a slurry of a semiconductive glaze product shown in Table 1 (Working Examples and Comparative Examples).

Each of the thus-prepared semiconductive glaze slurries of Working Examples of the present invention and Comparative Examples was applied to a plate-like test piece (20 mm×40 mm×60 mm) such that the thickness of the glaze coating became 0.3 to 0.4 mm. After the glaze slurry was dried, the resultant test piece was fired (maximum firing temperature: 1,275° C.). The resultant test piece was subjected to measurement of surface resistivity, and the appearance of the test piece was visually evaluated. In order to measure surface resistivity, electrodes were provided on the surface of the test piece at an interval of 1 cm, and a predetermined current was caused to flow between the electrodes. If the surface resistivity becomes too high to be measured, the semiconductive glaze product can not function as a conductive glaze. Thus, the surface resistivity must be about 1,000 MΩ or less. The appearance of the test piece was evaluated through visual observation of surface unevenness occurring on the glaze coating of the test piece as a result of generation of air bubbles. The appearance was evaluated on the basis of the following criteria: AA: no uneven portions are observed on the glaze coating; BB: some uneven portions are observed on the glaze coating, but the unevenness is lower than a predetermined level, causing no problems; and DD: many uneven portions are observed on the glaze coating, and the unevenness is higher than a predetermined level, causing problems. The results are shown in Table 1.

Meanwhile, each of the above-prepared semiconductive glaze slurries of Working Examples and Comparative Examples was applied to a station post insulator main body (employed under application of 77 kV, diameter: 105 mm) formed of a non-cristobalite base material. After the glaze slurry was dried, the resultant insulator main body was fired (maximum firing temperature: 1,275° C.). A predetermined bracket was attached to the thus-fired insulator main body by use of cement. The resultant insulator product was subjected to bending fracture test, whereby its fracture load was determined. An insulator product having high fracture load is preferred. When the thermal expansion coefficient of the employed semiconductive glaze product is low, the fracture load becomes high. The results of the test are shown in Table 1.

TABLE 1

| Base glaze (Seger formula) | | | Amount of added boron (wt %) | TP test | | Product evaluation Fracture load (kN) |
|---|---|---|---|---|---|---|
| KNaO | CaO | MgO | | Surface resistivity (MΩ) | Appearance | |
| Working Examples | | | | | | |
| 0.1 | 0.7 | 0.2 | 3 | 5 | AA | 29.5 |
| 0.25 | 0.55 | 0.2 | 7 | 10 | AA | 28 |
| 0.4 | 0.4 | 0.2 | 5 | 8 | AA | 28.5 |
| 0.2 | 0.55 | 0.25 | 5 | 13 | AA | 32.3 |
| 0.35 | 0.4 | 0.25 | 3 | 12 | AA | 31 |
| 0.1 | 0.5 | 0.4 | 1 | 30 | BB | 32.6 |
| 0.25 | 0.35 | 0.4 | 5 | 45 | AA | 33.7 |
| 0.4 | 0.2 | 0.4 | 5 | 55 | AA | 28.9 |
| 0.2 | 0.3 | 0.5 | 3 | 120 | AA | 34 |
| 0.2 | 0.3 | 0.5 | 10 | 910 | AA | 27.7 |
| 0.35 | 0.15 | 0.5 | 3 | 130 | AA | 31.4 |
| 0.1 | 0.3 | 0.6 | 7 | 1,000 | BB | 28.5 |
| 0.25 | 0.15 | 0.6 | 5 | 810 | BB | 28.2 |
| 0.4 | 0 | 0.6 | 3 | 680 | BB | 28 |
| Comparative Examples | | | | | | |
| 0.1 | 0.8 | 0.1 | 5 | 9 | AA | 19.6 |
| 0.3 | 0.6 | 0.1 | 3 | 6 | AA | 18.8 |
| 0.5 | 0.4 | 0.1 | 7 | 12 | AA | 17.7 |
| 0.5 | 0.2 | 0.3 | 3 | 13 | AA | 17.9 |
| 0 | 0.6 | 0.4 | 5 | 51 | DD | 15 |
| 0.5 | 0 | 0.5 | 10 | 870 | BB | 14.5 |
| 0 | 0.4 | 0.6 | 5 | 780 | DD | 14.7 |
| 0.1 | 0.2 | 0.7 | 5 | — | DD | 14.3 |
| 0.3 | 0 | 0.7 | 3 | — | DD | 13.9 |
| 0.2 | 0.55 | 0.25 | 15 | — | AA | 23.3 |

—: Not measurable

As is clear from the results of Working Examples and Comparative Examples shown in Table 1, the compositional proportions as represented by the Seger formula of the basic components; i.e., KNaO, MgO, and CaO, of the base glaze should be 0.1 to 0.4, 0.2 to 0.6, and balance, respectively; and the amount of boron oxide which is added as a flux should be 10 parts by weight or less on the basis of 100 parts by weight of the glaze composition. Also, comparison between the results of Working Examples reveal that the compositional proportions of KNaO and MgO as represented by the Seger formula are preferably 0.2 to 0.35 and 0.25 to 0.5, respectively.

Example 2

In connection with a preferred embodiment of the present invention, the effects of $Al_2O_3$ and $SiO_2$ contained in a base glaze were evaluated as follows. Specifically, the amount of boron oxide (i.e., a flux) added to a glaze composition was determined to be 3 parts by weight on the basis of 100 parts by weight of the glaze composition; the compositional proportions of KNaO, MgO, and CaO as represented by the Seger formula contained in the base glaze were determined to be 0.25, 0.4, and 0.35, respectively; and the compositional proportions of $Al_2O_3$ and $SiO_2$ were varied as shown in Table 2, to thereby prepare a semiconductive glaze product. In a manner similar to that of Example 1, the thus-prepared semiconductive glaze product was applied to a test piece and an insulator main body, and the surface resistivity and appearance of the resultant test piece were evaluated, as well as the fracture load of the resultant insulator product was obtained. The results are shown in Table 2. Rating CC shown in the column "appearance" of Table 2 refers to the case where many uneven portions were observed on the glaze coating of the test piece, but the unevenness was at the minimum level at which the semiconductive glaze product can actually be used in practice.

TABLE 2

| Base glaze (Seger formula) | | TP test | | Product evaluation Fracture load (kN) |
|---|---|---|---|---|
| $Al_2O_3$ | $SiO_2$ | Surface resistivity (MΩ) | Appearance | |
| 0.5 | 4 | 30 | BB | 29.4 |
| 0.5 | 5 | 35 | AA | 29.2 |
| 0.5 | 7 | 41 | BB | 32 |
| 0.7 | 4 | 29 | BB | 29.6 |
| 0.7 | 5 | 33 | AA | 33.1 |
| 0.7 | 7 | 28 | BB | 32.6 |
| 0.9 | 4 | 55 | BB | 30.1 |
| 0.9 | 5 | 36 | BB | 32.8 |
| 0.9 | 7 | 29 | BB | 31.7 |
| 0.3 | 4 | 30 | BB | 26.1 |
| 0.3 | 7 | 34 | CC | 27.3 |
| 0.7 | 3 | 35 | BB | 25.9 |
| 0.7 | 8 | 37 | CC | 28 |
| 1.1 | 4 | 57 | BB | 27.4 |
| 1.1 | 7 | 67 | CC | 27 |

The results shown in Table 2 reveal that the compositional proportions of $Al_2O_3$ and $SiO_2$ as represented by the Seger formula are preferably 0.5 to 0.9 and 4 to 7, respectively.

Example 3

In connection with another preferred embodiment of the production method of the present invention, the effect of a Ca source for CaO constituting a base glaze was evaluated, as well as the effects of the size of milled particles of raw materials; i.e., a glaze composition and a flux. Specifically, the amount of boron oxide serving as the flux was determined to be 3 parts by weight on the basis of 100 parts by weight of the glaze composition; the compositional proportions of components constituting the base glaze; i.e., KNaO, MgO, CaO, $SiO_2$, and $Al_2O_3$, as represented by the Seger formula, were determined to be 0.25, 0.4, 0.35, 5, and 0.7, respectively; and the Ca source and the size of milled particles were varied as shown in Table 3, to thereby prepare a semiconductive glaze product. Regarding the Ca source, wollastonite was compared with calcium carbonate, which has been conventionally employed as a Ca source. The amount (wt. %) of particles having a size of 10 μm or more contained in the milled particles was obtained by use of a milled particle measuring apparatus (Sedigraph). In a manner similar to that of Example 1, the thus-prepared semiconductive glaze product was applied to a test piece and an insulator main body, and the surface resistivity and appearance of the resultant test piece were evaluated, as well as the fracture load of the resultant insulator product was obtained. The results are shown in Table 3. Rating CC shown in the column "appearance" of Table 3 refers to the case where many uneven portions were observed on the glaze coating of the test piece, but the unevenness was at the minimum level at which the semiconductive glaze product can actually be used in practice.

TABLE 3

| Ca source | Size of milled particles | TP test | | Product evaluation Fracture load (kN) |
|---|---|---|---|---|
| | | Surface resistivity (MΩ) | Appearance | |
| Wollastonite | 5.1% | 35 | AA | 33.1 |
| Wollastonite | 10.5% | 36 | AA | 32.8 |
| Wollastonite | 15.0% | 34 | AA | 30.9 |
| Wollastonite | 21.0% | 32 | BB | 28.2 |
| Calcium carbonate | 9.8% | 37 | BB | 29.7 |
| Calcium carbonate | 18.0% | 36 | CC | 30.9 |

The results shown in Table 3 reveal that the amount of particles having a size of 10 μm or more contained in the milled particles of the glaze composition and flux (raw materials) are preferably determined to be 15 wt. % or less. The results also reveal that the Ca source for CaO constituting the base glaze is preferably wollastonite.

The present invention is not limited to the aforementioned Examples, and various modifications may be performed. In the aforementioned Examples, boron oxide was employed as a flux. However, a compound (other than boron oxide) which has been conventionally known as a flux; for example, titanium oxide, strontium oxide, barium oxide, or lithium oxide may be employed. Needless to say, such a compound exhibits an effect similar to that yielded by boron oxide. It goes without saying that the basic components (KNaO, MgO, and CaO) employed in the aforementioned Examples further contain minute amounts of iron oxide, titanium oxide, manganese oxide, and chromium oxide. In the above-described Examples, the metal oxide composition containing tin oxide, antimony oxide, and niobium oxide was employed. However, needless to say, the metal oxide composition does not necessarily contain niobium oxide.

In the aforementioned method for producing a semiconductive glaze product of the present invention, while raw materials—which contain large particles—are mixed together, the particle size of raw materials is reduced through milling so that the raw materials have a predetermined particle size. However, when raw materials which have been reduced in size beforehand are available, needless to say, a desired glaze product can be produced merely by mixing the raw materials.

As described above, according to the present invention, the compositional proportions of KNaO, MgO, and CaO (i.e., basic components) as represented by the Seger formula, which constitute a base glaze contained in a glaze composition, are regulated to 0.1 to 0.4, 0.2 to 0.6, and balance, respectively, and the amount of a flux is regulated to 10 parts by weight or less on the basis of 100 parts by weight of the glaze composition. By virtue of the synergistic effects obtained by regulation of the compositional proportions of the basic components of the base glaze and regulation of the amount of the flux, the resultant semiconductive glaze product exhibits excellent melting characteristics and low thermal expansion coefficient without adversely affecting other glaze characteristics. Therefore, when the semiconductive glaze product is applied to an insulator, the resultant insulator exhibits high mechanical strength.

In addition, the glaze product produces excellent surface conditions, and therefore the resultant insulator exhibits high electrolytic corrosion resistance.

Even when contaminated, the insulator exhibits excellent electrical insulating characteristics, corona characteristics, and thermal stability.

Obviously, numerous modifications and variations of the present invention are possible in light of the above teachings. It is therefore to be understood that within the scope of the appended claims, the present invention may be practiced otherwise than as specifically described herein.

What is claimed is:

1. A semiconductive glaze product comprising:
a glaze composition including a KNaO—MgO—CaO—$Al_2O_3$-$SiO_2$-based base glaze and a metal oxide composition including tin oxide and antimony oxide, wherein relative compositional proportions of the base glaze, as represented by the Seger formula of basic components, include KNaO in a range of 0.1 to 0.4, MgO in a range of 0.2 to 0.6, CaO in a range of 0.2 to 0.7, $Al_2O_3$ in a range of 0.5 to 0.9 and $SiO_2$ in a range of 4 to 7; and
a flux in an amount of 10 parts by weight or less based on 100 parts by weight of the glaze composition.

2. The semiconductive glaze product according to claim 1, wherein the flux is boron oxide.

3. The semiconductive glaze product according to claim 1, wherein the glaze composition comprises 60 to 80 wt % of the base glaze and 20 to 40 wt % of the metal oxide composition and to total 100 wt % of the glaze composition.

4. The semiconductive glaze product according to claim 1, wherein the metal oxide composition includes 2 to 15 wt % of antimony oxide.

5. The semiconductive glaze product according to claim 1, wherein the metal oxide composition includes niobium oxide in an amount of 5 wt % or less.

6. An insulator comprising an insulator main body whose surface is coated with a semiconductive glaze product as recited in claim 1.

* * * * *